United States Patent
Toyoda et al.

[11] Patent Number: 5,260,792
[45] Date of Patent: Nov. 9, 1993

[54] AGC CIRCUIT WITH 60 HERTZ HUM COMPENSATION

[75] Inventors: Yoshikazu Toyoda; Takashi Hashimoto; Tokuji Iijima; Satoshi Iwasaki, all of Tokyo, Japan

[73] Assignee: Pioneer Electronic Corporation, Tokyo, Japan

[21] Appl. No.: 864,569

[22] Filed: Apr. 9, 1992

[30] Foreign Application Priority Data

Apr. 12, 1991 [JP] Japan .................. 3-079799

[51] Int. Cl.⁵ .......................... H04N 5/52; H04N 5/21
[52] U.S. Cl. ........................... 358/167; 358/177
[58] Field of Search ............. 330/141, 281; 358/174, 358/177, 167, 188, 184

[56] References Cited

U.S. PATENT DOCUMENTS

| | | | |
|---|---|---|---|
| 3,558,816 | 1/1971 | Wise | 358/177 |
| 3,684,823 | 8/1972 | McVoy | 358/84 |
| 3,740,473 | 6/1973 | von der Ohe | 358/178 |
| 4,292,598 | 9/1981 | Yasumura | 358/177 |
| 4,884,141 | 11/1989 | Hyakutake | 358/174 |
| 4,885,546 | 12/1989 | Araki | 358/174 |

*Primary Examiner*—Mark R. Powell
*Attorney, Agent, or Firm*—Kane, Dalsimer, Sullivan, Kurucz, Levy, Eisele and Richard

[57] ABSTRACT

An AGC circuit comprises an AGC filter, a hum detection circuit, and a time constant control circuit. The hum detection circuit detects a hum component included in an AGC signal. The time constant control circuit automatically controls the time constant of the AGC filter in accordance with the level of a detected hum component in such a manner that when the level of the hum component is large, the time constant of the AGC filter is varied to be small, while when the level of the hum component is small, the time constant of the AGC filter is varied to be large. Thus, the AGC filter outputs an AGC signal from which a noise component, particularly a hum component, is eliminated on the basis of a time constant determined by the time constant control circuit, so an AGC is carried out without the influence of the noise component included in the AGC signal.

14 Claims, 6 Drawing Sheets

AGC CIRCUIT WITH 60 HERTZ HUM COMPENSATION

BACKGROUND OF THE INVENTION

This invention relates to an AGC (Automatic Gain Control) circuit included in a TV (Television), a CATV converter, or the like, and more particularly to an AGC circuit having an AGC filter suitable for eliminating a hum noise included in an AGC signal.

With a CATV system or a TV, an AGC circuit is provided for controlling a level of a detected video signal in correspondence to changes of the intensity of a radio wave received by an antenna so as to keep the contrast of the reproduced video signal constant.

Generally, the AGC circuit is of a structure to prepare an AGC voltage from a detected video signal (composite video signal) to increase or decrease a gain of an RF (Radio Frequency) amplifier and a VIF (Video Intermediate Frequency) amplifier so that no change in the video level due to the intensity of a radio wave appears on a video signal. A mean value AGC circuit, a peak AGC circuit, and a keyed AGC circuit are well known as the AGC circuit.

In a conventional AGC circuit, an AGC filter (low pass filter) is generally used in order to eliminate a noise component in a high frequency band. In order to provide a desired characteristic of this AGC filter, various filter time constants are set according to transferring methods of the video signal.

An example of conventional AGC filters is shown in FIG. 1. In FIG. 1, reference numeral 100 denotes a VIF-IC, and a portion relating to the AGC circuit is illustrated. A VIF signal input from a VIF-IN terminal 10 is amplified by a VIF circuit 101, and is then video-detected at a video detection circuit 102. The detected video-signal is amplified at a video amplifier circuit 103, and is then delivered to a noise filter 104, at which excessively large noise components are eliminated. The noise eliminated video signal thus obtained is outputted from a VIDEO-OUT terminal 28. The video signal output from the VIDEO-OUT terminal 28 is input to a VIF AGC circuit 105, as an AGC control signal, through an aural carrier stop (trap) filter (not shown) and an AGC-IN terminal 26, and is then output from a VIF-AGC-OUT terminal 6. The AGC control voltage thus output is fed back to a VIF-AGC-IN terminal 7 through an AGC filter comprised of a resistor R and a capacitor C. The AGC voltage from which the noise-component in a high frequency band is eliminated by the AGC filter (R, C) is delivered to the VIF circuit 101. The amplification degree of the VIF circuit 101 is thus controlled in correspondence with the AGC voltage. Further, the AGC voltage is also delivered to a RF-AGC circuit 106. The RF-AGC circuit 106 outputs an AGC voltage (RF-AGC) from an RF-AGC OUT terminal 5 to control the amplification degree in a high frequency signal processing circuit.

As stated above, the AGC filter having the resistor R and the capacitor C is provided with the AGC circuit. In the conventional AGC circuit, the time constant of the AGC filter was fixed. However, in the case where the time constant is a fixed value, problems as described below would arise.

First, in the case where the value of the resistor R is fixed at a large value to set the filter time constant to a large value, there arises the problem that a hum component mixed in from the signal transmission system, etc. cannot effectively be eliminated, so the influence of the hum component appears on a television image. In the case of the CATV system, if a power supply voltage of a trank amplifier placed at the transmission system is weak in stability, an A.C. component of that power supply (i.e., a hum component) is mixed into a signal transmitted therethrough. As a result, such a hum component mixed into the transmitted signal would effect a hum-modulation on the RF signal to be transmitted. In a case where an RF signal is hum-modulated, the hum component is also superimposed on a detected video signal. Consequently, the hum component appears as any undesired fluctuation on a reproduced video image.

Further, the problem of the hum modulation also appears on the scramble processing used for protection from theft or cheating of a video. Particularly, in the case of the CATV system using an inverter type scramble processing, problems as described below would arise.

The inverter type scramble processing comprising the steps of inverting, by using a scrambler on the transmission center side, a video signal portion VS of an original TV signal (FIG. 2), applying an AM modulation to an RF carrier by the inverted waveform (FIG. 3), transmitting the signal thus modulated (FIG. 4), and inverting, by using a descrambler of a receiving side converter, the signal transmitted to thereby restore it to the original TV signal (FIG. 6). It is to be noted that, in the above respective figures, the portions on the left side represent a TV signal waveform, on one horizontal line (e.g. line 30), those on the right side represent a TV signal waveform on another horizontal line (e.g. line 150).

However, in the case where a hum component is superimposed on an inverted TV signal transmitted, the level (solid line) of an inverted TV signal varies with respect to the level (broken lines) of an original inverted TV signal as shown in FIG. 5. FIG. 5 shows the example where the hum component is superimposed by 2% on the inverted TV signal transmitted, wherein the level of the horizontal line 30 rises and the level of the horizontal line 150 lowers. As shown in FIG. 6, in the case where the inverted TV signal whose level is changed by the hum component is descrambled and only an image signal portion is re-inverted to restore the original TV signal, the magnitude of the TV signal of the horizontal line 30 becomes small, while the magnitude of the TV signal of the horizontal line 150 becomes large. Thus, a difference B of luminance signal level and a difference S of horizontal synchronizing signal level are produced.

FIG. 7 shows a waveform of a video signal detected by a conventional converter or a video signal obtained by remodulating the waveform shown in FIG. 6 by a CATV converter and then detecting it by TV. That is, since the time constant of AGC filter of a television is small, the signal levels are fixed to allow the levels of the respective synchronizing signal portions to be a predetermined constant value. Accordingly, the level of the video signal portion VS is lowered some degree at the horizontal line 30 and is raised at the horizontal line 150. As a result, at the signal portions on which the hum component is superimposed, luminance levels (i.e., D.C. levels) might fluctuate in above-described manner, resulting in deteriorated picture quality.

In addition, the problem of the hum modulation occurs in the case where the hum elimination percentage or rate is low at a control voltage for tuning control. In a TV or a CATV converter, in order to eliminate the noise component at the sync chip portion and/or the pedestal portion of a horizontal synchronizing signal of a detected video output signal, a technique is employed to replace those portions by a fixed D.C. voltage (U.S. Pat. No. 5,113,439).

In such a case, since the influence of the hum modulation is left only at the image signal portion, there also takes place the problem that thick and thin portions of the scanning line appear on the image reproduced.

Second problem is as follows. In the case where the value of the resistor R is set to a small value to thereby set the filter time constant to a small value, while the hum-modulated portion of an RF signal is eliminated from the detected video signal, the noise component would be superimposed also on the video signal portion in proportion to changes in the noise component on the sync chip portion or the pedestal level. As a result, fluctuation of an image resulting from the noise component appears on the reproduced image.

Accordingly, when the time constant of the AGC filter is fixed as described above, there was the inconvenience that the noise component cannot be completely eliminated.

SUMMARY OF THE INVENTION

An object of this invention is to provide an AGC filter capable of effectively eliminating any noise component in accordance with the magnitude of hum-modulated noise component and reproducing an image having a high picture quality.

According to one aspect of this invention, there is provided an AGC circuit comprising a high-frequency amplifier circuit for amplifying an input signal of RF signal or IF signal, a gain control circuit for changing a gain of said amplifier circuit in correspondence with an AGC signal, an AGC filter for eliminating a noise component from said AGC signal, a hum detection circuit for detecting a level of hum noise included in said AGC signal, and a time constant changing circuit for changing a time constant of said AGC filter, in correspondence with the detected level of said hum detection circuit, to be a small value when the level of said hum noise component is large.

In accordance with this invention, the hum detection circuit detects a hum component included in an AGC detection signal. Further, the time constant control circuit automatically carries out a control of the time constant in accordance with the level of a detected hum component, i.e., such that when the hum component is large, the control circuit allows the time constant of the AGC filter to be small, while when the hum component is small, the control circuit allows the time constant to be large.

Accordingly, since a hum component is detected at the hum detection circuit to automatically control the time constant of the AGC filter in correspondence with the level of the detected hum component, it is possible to suppress not only fluctuation of an image due to the hum component, but also fluctuation of an image due to noise of sync chip, etc. Thus, drawbacks or problems based on superimposition of the hum component to the system can be prevented.

Further, this AGC filter is advantageous especially to a CATV converter employing a method of replacing the sync chip portion of a horizontal synchronizing signal by a fixed D.C. voltage.

In addition, this AGC filter is also advantageous to prevention of deterioration in picture quality in case of reproducing the inverting type scramble system of the CATV system.

DESCRIPTION OF THE PREFERRED EMBODIMENT

A preferred embodiment of this invention will now be described with reference to the attached drawings.

Figure 8:
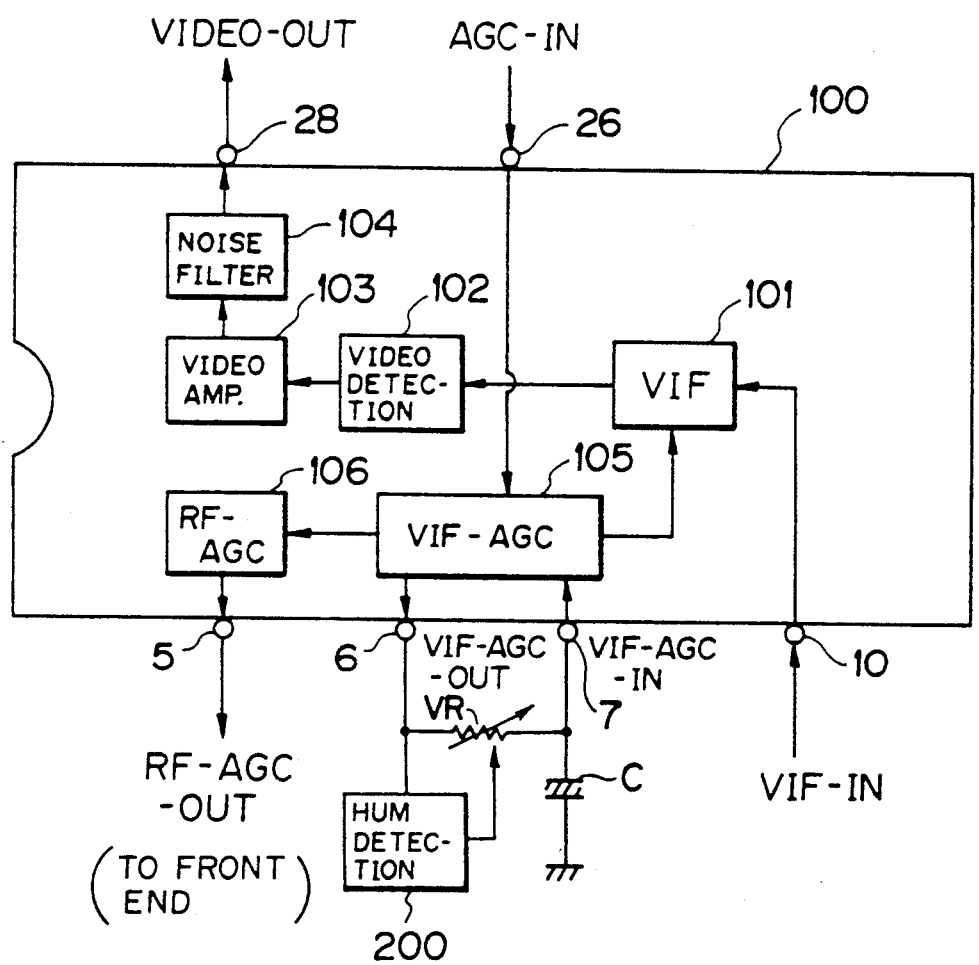
FIG. 8 is a circuit diagram showing an AGC circuit of the present invention.

FIG. 8 is a circuit diagram showing the outline of this invention. It is to be noted in FIG. 8 that the same reference numerals are attached to the same portions as those in FIG. 1, respectively.

Figure 1:
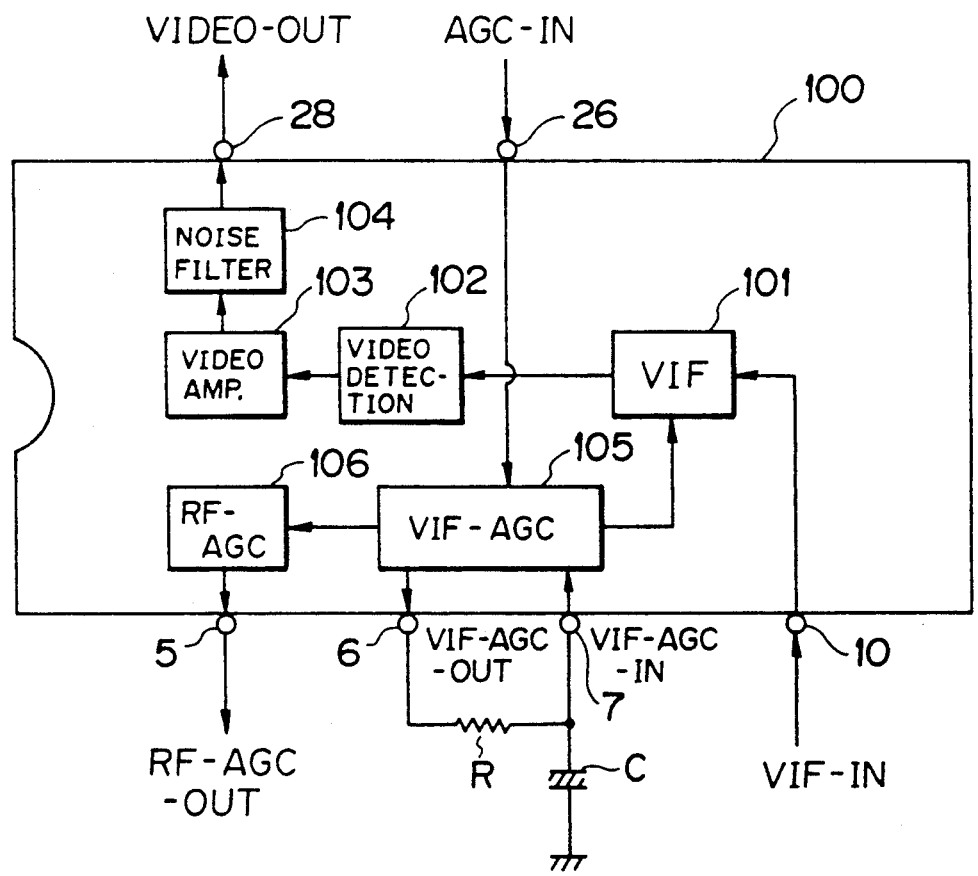
FIG. 1 is a circuit diagram showing a conventional AGC filter.
Figure 2:
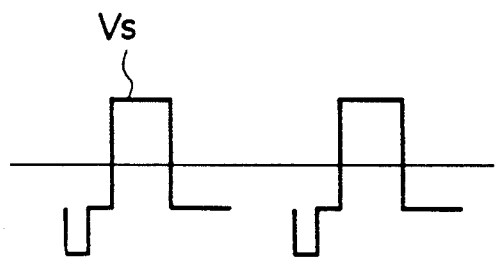
FIG. 2 is a waveform diagram showing an original TV signal.
Figure 3:
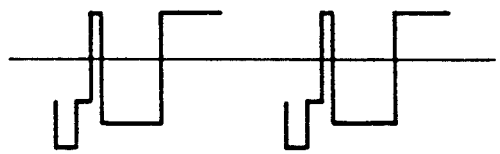
FIG. 3 is a waveform diagram showing an inverted TV signal.
Figure 4:
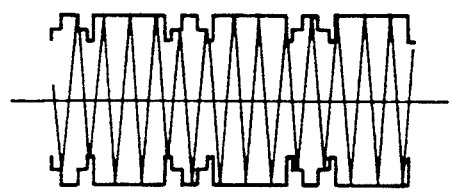
FIG. 4 is a waveform diagram showing an AM modulated signal produced by a scramble processing.
Figure 5:
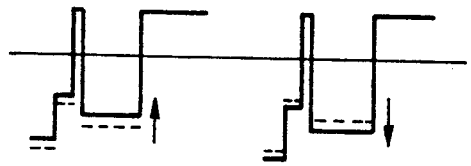
FIG. 5 is waveform diagram showing an inverted TV signal subjected to the influence of a hum component.
Figure 6:
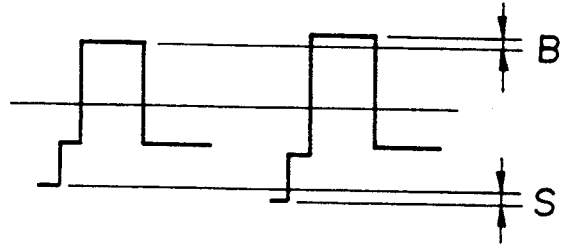
FIG. 6 is a waveform diagram showing a re-inverted TV signal produced by descramble processing.
Figure 7:
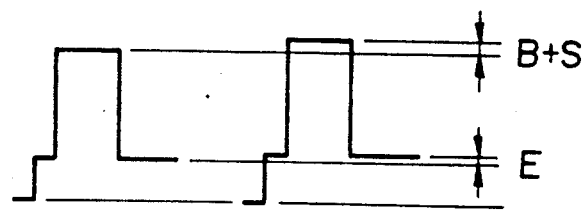
FIG. 7 is a waveform diagram showing a detected video signal.

The circuit arrangement in FIG. 8 differs from that of FIG. 1 as follows. First, a low-pass filter resistor externally connected between VIF-AGC-OUT terminal 6 and VIF-AGC-IN terminal 7 of VIF-IC 100 is constructed as a variable resistor VR. Secondly, a hum detection circuit 200 for detecting a hum component from a VIF-AGC signal output from the VIF-AGC-OUT terminal 6 is provided. As the circuit is thus constructed, the resistance value of the variable resistor VR is varied, in correspondence with an output signal from the hum detection circuit 200, so as to control the time constant ($\tau = VR \times C$ [sec]) of the AGC filter to follow changes of the level of the hum component.

Figure 9:
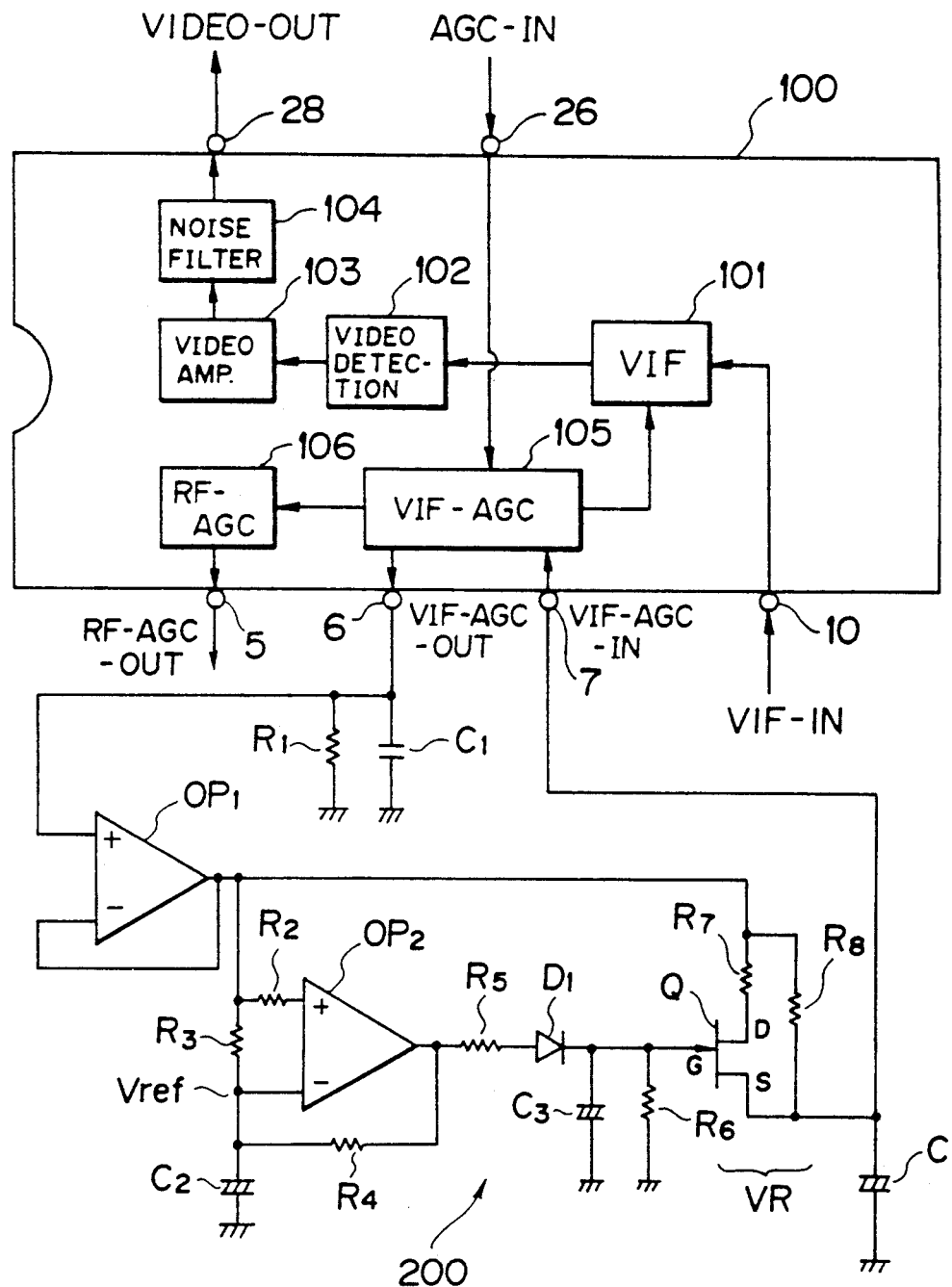
FIG. 9 is a circuit diagram showing an AGC filter of the present invention.

A detailed circuit construction of the variable resistor VR and the hum detection circuit 200 is shown in FIG. 9.

As shown in FIG. 9, a VIF-AGC signal output from the VIF-AGC-OUT terminal 6 is applied to the non-inverting input terminal of an operational amplifier OP1. This operational amplifier OP1 serves as an impedance converter comprised of a voltage follower and the same signal as the VIF-AGC signal is output therefrom. This VIF-AGC signal is delivered to the drain of a transistor Q through a low-pass filter resistor R7, also to the non-inverting input terminal of an operational amplifier OP2 through a bias resistor R2, and further to the inverting input terminal of the operational amplifier OP2 through a bias resistor R3. To the inverting input terminal of the operational amplifier OP2 is connected one terminal of a hum component detection capacitor C2, while the other terminal of which is grounded.

The operational amplifier OP2 constitutes a comparator, and an output therefrom is fed back to the inverting input terminal thereof, through feed back resistor R4, as a reference voltage Vref. Thus, the operational amplifier OP2 makes a comparison between the reference voltage Vref and an output signal of the operational amplifier OP1. A frequency component higher than a hum component (A.C. frequency of 60 Hz, its higher harmonic of 120 Hz) in an output signal of the operational amplifier OP1 does not affect an output of the operational amplifier OP2 because the time constant of the capacitor C2 and the resistor R3 is large. However, in the case where there is included any hum component, a pulse wave is output from the output terminal of the operational amplifier OP2 in correspondence with the amplitude level of the hum component. That is, when such a hum component is large, a pulse wave having a great duty ratio is output from the output terminal of the operational amplifier OP2. An output signal from the operational amplifier OP2 is converted to an D.C. voltage through a rectifier circuit comprised of a resistor R5 and a diode D1 and a smoothing circuit comprised of a smoothing capacitor C3 and a resistor R6. The D.C. voltage thus obtained is applied to the gate of the transistor Q.

When an input D.C. voltage to the transistor Q is at a high level, the transistor Q serves to broaden the channel region between the drain D and the source S and thus functions as a low resistance element. Namely, the time constant of the AGC filter is determined corresponding to the resistance value VR of a circuit comprised of a series resistor R7, the transistor Q and a low-pass filter resistor R8. When the level of an output signal of the operational amplifier OP2 is high, i.e., the degree of modulation by the hum component is large, the transistor Q functions as a low resistance element and accordingly the time constant $\tau = VR \times C$ (VR=R8//R7) becomes small. In contrast, when the level of an output signal of the operational amplifier OP2 is small, i.e., the degree of modulation by the hum component is small, the transistor Q functions as a high resistance element and accordingly, the time constant $\tau = R8 \times C$ becomes large.

In this way, it is possible to automatically carry out a follow up control of the time constant of the AGC filter in accordance with the level of a hum component and its higher harmonic component included in a VIF-AGC signal output from the VIF-AGC-OUT terminal 6.

Figure 10:
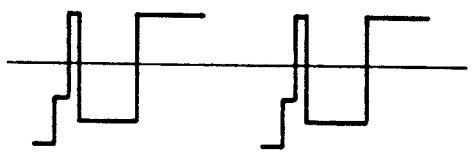
FIG. 10 is a waveform diagram showing an inverted TV signal.
Figure 11:
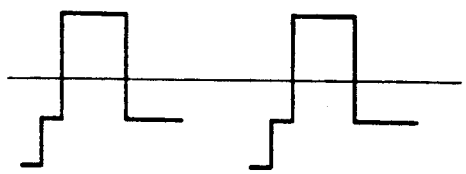
FIG. 11 is a waveform diagram showing a re-inverted TV signal.
Figure 12:
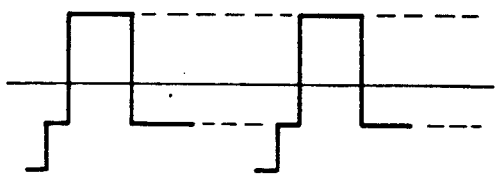
FIG. 12 is a waveform diagram showing a detected video signal.

Thus, according to this invention, a hum component is detected and the time constant of the AGC filter is changed to be small when the level of the hum component is large. Accordingly, hum interference can be eliminated from the reproduced video signal, as shown in FIG. 10. Further, when the inverted video signal from which the hum component is eliminated is re-inverted to restore the original video signal, the time constant of the AGC circuit is changed according to the level of the hum component noise. Accordingly, no erroneous change of the luminance level and/or the horizontal synchronizing signal level is produced (FIG. 11), and the hum interference is completely suppressed also in the detected video signal (FIG. 12).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An AGC circuit comprising:
   a high-frequency amplifier circuit for amplifying an input signal,
   a gain control circuit for changing a gain of said amplifier circuit in correspondence with an AGC signal,
   a hum detection circuit for detecting a level of a hum component having an A.C. power supply frequency mixed in said AGC signal, and
   an AGC filter for eliminating a noise component from said AGC signal, said AGC filter including a time constant varying circuit for varying a time constant of said AGC filter, in accordance with the detected level of said hum detection circuit, so as to be a small value so that said AGC filter filters out the hum component when the level of said hum component is large.

2. An AGC circuit comprising:
   a high-frequency amplifier circuit for amplifying an input signal,
   a gain control circuit for changing a gain of said amplifier circuit in correspondence with an AGC signal,
   a hum detection circuit for detecting a level of a hum component having an A.C. power supply frequency mixed in said AGC signal, and
   an AGC filter for eliminating a noise component from said AGC signal, said AGC filter including a time constant varying circuit for varying a time constant of said AGC filter, in accordance with the detected level of said hum detection circuit, so as to be large value so that said AGC filter passes the hum component when the level of said hum component is small.

3. An AGC circuit comprising:
   a high-frequency amplifier circuit for amplifying an input signal,
   a gain control circuit for changing a gain of said amplifier circuit in correspondence with an AGC signal,
   an AGC filter for eliminating a noise component from said AGC signal,
   a comparator circuit for outputting a signal indicative of a comparison value between said AGC signal and a reference signal generated on the basis of said AGC signal,
   a rectifier circuit for rectifying an output signal from said comparator circuit,
   a variable resistance element whose resistance value varies in accordance with an input signal from said rectifier circuit, and
   a capacitor being connected between said variable resistance element and ground.

4. An AGC circuit according to claim 3, wherein said comparator circuit comprises an operational amplifier having an output terminal, a non-inverting input terminal and an inverting input terminal, a resistor and a capacitor, said resistor being connected between the output terminal and the inverting terminal of the operational amplifier, and said capacitor being connected between the inverting input terminal of the operational amplifier and ground.

5. An AGC circuit according to claim 3, wherein said rectifier circuit comprises a diode, a capacitor and a resistor, said capacitor and said resistor being connected between a cathode of the diode and ground in parallel with each other.

6. An AGC circuit according to claim 3, wherein said variable resistance element comprises a first resistor, a second resistor and a transistor, said first resistor being connected in parallel with a series connected circuit of the second resistor and the transistor.

7. An AGC circuit according to claim 1, wherein said high-frequency amplifier circuit amplifies an inverter type scramble signal of a CATV system.

8. An AGC circuit according to claim 1, wherein said high-frequency amplifier circuit amplifies an RF signal and an IF signal of a converter unit included in a CATV system.

9. An AGC circuit according to claim 1, wherein said high-frequency amplifier amplifies an RF signal and an IF signal of TV.

10. An AGC circuit according to claim 1, wherein said time constant changing circuit comprises resistors, a capacitor and a switching element.

11. An AGC circuit according to claim 3, wherein said high-frequency amplifier circuit amplifies an inverter type scramble signal of a CATV system.

12. An AGC circuit according to claim 3, wherein said high-frequency circuit amplifies an RF signal and an IF signal of a converter unit included in a CATV system.

13. An AGC circuit according to claim 3, wherein said high-frequency amplifier circuit amplifies an RF signal and an IF signal of TV.

14. An AGC circuit according to claim 3, wherein said time constant varying circuit comprises resistors, a capacitor and a switching element.

* * * * *